US006508316B2

(12) United States Patent
Estes et al.

(10) Patent No.: US 6,508,316 B2
(45) Date of Patent: Jan. 21, 2003

(54) APPARATUS TO MEASURE THE EARTH'S LOCAL GRAVITY AND MAGNETIC FIELD IN CONJUNCTION WITH GLOBAL POSITIONING ATTITUDE DETERMINATION

(75) Inventors: Robert Alan Estes, Tomball; Hatem Salem Morsy, The Woodlands; Andrew G. Brooks, Tomball, all of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/740,082

(22) Filed: Dec. 18, 2000

(65) Prior Publication Data

US 2002/0005298 A1 Jan. 17, 2002

Related U.S. Application Data

(63) Continuation-in-part of application No. 09/329,857, filed on Jun. 11, 1999, now Pat. No. 6,179,067, and a continuation-in-part of application No. 09/309,864, filed on May 11, 1999, now Pat. No. 6,212,476.
(60) Provisional application No. 60/089,100, filed on Jun. 12, 1998, and provisional application No. 60/085,471, filed on May 14, 1998.

(51) Int. Cl.[7] ............................................. E21B 47/022
(52) U.S. Cl. ................................. 175/45; 33/304; 702/6
(58) Field of Search ......................... 702/1, 6, 10, 11; 175/40, 45; 33/302, 304, 312, 313, 328, 310, 316

(56) References Cited

U.S. PATENT DOCUMENTS

| | | | |
|---|---|---|---|
| 4,682,421 A | 7/1987 | van Dongen et al. | 33/302 |
| 4,709,486 A | 12/1987 | Walters | 33/304 |
| 4,956,921 A | 9/1990 | Coles | 33/304 |
| 5,321,893 A | 6/1994 | Engebretson | 33/304 |
| 5,617,317 A | 4/1997 | Ignagni | 364/449.9 |
| 5,623,407 A | 4/1997 | Brooks | 364/422 |

FOREIGN PATENT DOCUMENTS

| | | |
|---|---|---|
| EP | 0 437 372 A2 | 7/1991 |
| EP | 0 793 000 A2 | 9/1997 |
| WO | WO 98/07958 | 2/1998 |

OTHER PUBLICATIONS

J.P. Russell et al.; *Reduction of Well–Bore Positional Uncertainty Through Application of a New Geomagnetic In–Field Referencing Technique*, SPE 30452, SPE Annual Technical Conference & Exhibition in Dallas, Oct. 22–26, 1995, pp. 1–16.

Rick DiPersio, *Alaskan North Monitor Test Report*, Teleco/BP Exploration Alaska Magnetics Project, Prudhoe Bay Field Test Report, Dec. 20, 1991, pp. 1–14, 1 Figure.

*Primary Examiner*—Robert E. Pezzuto
(74) *Attorney, Agent, or Firm*—Madan, Mossman & Sriram, P.C.

(57) ABSTRACT

The present invention provides a method for determining magnetometer errors during wellbore survey operations. It is capable of determining errors on up to three axes, with or without the use of an external reference measurement of the local magnetic field, and is capable of providing an accurate result using data from a minimum number of surveys. A model is used to correct the observed data and the corrected data are transformed from the tool coordinate system to a different coordinate system referenced to the earth. The difference between the corrected transformed data and reference data in the earth coordinate system is minimized to determine the model parameters. The present invention also provides a method for determining residual uncertainty in the measurements and for quality control of the measurements. Once a survey has been obtained with reference to magnetic north, it is corrected using magnetic declination data obtained concurrently with the survey using surface GPS receivers, magnetometers and accelerometers.

21 Claims, 4 Drawing Sheets

APPARATUS TO MEASURE THE EARTH'S LOCAL GRAVITY AND MAGNETIC FIELD IN CONJUNCTION WITH GLOBAL POSITIONING ATTITUDE DETERMINATION

CROSS REFERENCES TO RELATED APPLICATIONS

This application is a Continuation-in-Part of U.S. patent application Ser. No. 09/329,857 filed on Jun. 11, 1999, now U.S. Pat. No. 6,179,067, taking priority from U.S. Provisional Patent Application Ser. No. 60/089,100 filed on Jun. 12, 1998. The present application is also a Continuation-in-Part of U.S. patent application Ser. No. 09/309,864 filed on May 11, 1999, now U.S. Pat. No. 6,212,476 claiming priority from U.S. Provisional Patent Application Ser. No. 60/085,471 filed on May 14, 1998.

BACKGROUND OF THE INVENTION

1. Field of the Invention

The present invention is related to the field of surveying of wellbores. Specifically, the present invention uses 3-component magnetometer and accelerometer data downhole to determine an azimuth of the borehole relative to magnetic north and then uses a determination of magnetic declination using Global Positioning Satellite (GPS) data to obtain an azimuth relative to true north.

2. Description of the Prior Art

Surveying of wellbore orientation is commonly performed by the use of instruments containing sets of three orthogonal axes accelerometers and magnetometers, which are inserted within the drillstring and used to measure the orientations of the local gravitational and magnetic field vectors. In order to measure the earth's magnetic field, which is used as a north reference from which wellbore azimuth may be computed, the instruments must be placed within a section of non-magnetic material extending between upper and lower ferromagnetic drillstring sections. These ferromagnetic portions of the drillstring tend to acquire magnetization as they are repeatedly strained in the earth's magnetic field during drilling operations. The nominally non-magnetic portion of the drillstring may also acquire some lesser magnetization as a result of imperfections. The result is that magnetometer measurements made by an instrument within a drillstring may measure not the undisturbed magnetic field, but the vector sum of the earth's field and an error field caused by drillstring magnetization. Since the tool is fixed with respect to the drillstring, the error field is fixed with respect to the tool's coordinate system and it appears as bias errors on the magnetometer measurements, which can lead to errors in the determination of wellbore azimuth and trajectory unless measures are taken to compensate for these bias errors.

Since the greater part of the drillstring magnetization occurs in the ferromagnetic portions of the drillstring, which are displaced axially from the instrument, the bias error in the axial direction usually exceeds the transverse bias errors. Various methods have therefore been published which seek to determine axial magnetometer bias errors in a single directional survey, including U.S. Pat. No. 3,791,043 to Russell, U.S. Pat. No. 4,163,324 to Russell, Re. U.S. Pat. No. 33,708 to Roesler, U.S. Pat. No. 4,761,889 to Cobern, U.S. Pat. No. 4,819,336 to Russell, U.S. Pat. No. 4,999,920 to Russell, and U.S. Pat. No. 5,155,916 to Engebretson. All of these methods require the provision of an independent estimate of one or more components of the earth's magnetic field, and as a result all of them tend to lose accuracy in those attitudes in which the direction of the independent estimate is perpendicular to the drillstring and therefore contributes little or no axial information. In particular, all of these methods lose accuracy as the wellbore attitude approaches horizontal east-west. A number of methods have also been published which seek to determine magnetometer biases on all three axes, including U.S. Pat. No. 4,682,421 to van Dongen and U.S. Pat. No. 4,956,921 to Coles, and UK Pat. No. 2,256,492 to Nicolle. While certain of these methods can resolve transverse bias components without external estimates of the field, they all require an independent estimate of the earth's magnetic field in order to determine the axial bias component, and therefore they also tend to lose accuracy as the attitude approaches horizontal east-west. U.S. Pat. No. 4,709,486 to Walters discloses a method for determining axial bias errors without any external estimate, by the simultaneous use of transverse magnetometer data from a plurality of surveys. However the method fails to make use of the valuable information contained in the axial magnetometer measurements, since it does not require any correlation between the axial biases determined at the plurality of attitudes. In U.S. Pat. No. 5,321,893, Engebretson discloses a method which may be used to determine magnetometer scale factor and bias errors from a plurality of surveys with or without requiring any external estimate of the earth's field. However, the method is inherently approximate since it requires the construction of a "measurement matrix", whose elements depend on the unknown borehole attitude and magnetic dip angle. U.S. Pat. No. 5,623,407 to the present inventor and having the same assignee discloses a method for determining magnetometer biases during wellbore survey operations, which is capable of determining biases on up to three axes, with or without the use of an external estimate of the local magnetic field, and which is capable of providing an accurate result using data from a minimum number of surveys. Also disclosed in U.S. Pat. No. 5,623,407 is a method for determining magnetometer biases which may vary between surveys in a predefined manner. What is lacking in prior art is the ability to deal with biases in the accelerometers and properly correcting for them,. the ability to estimate the uncertainty of corrected measurements and the ability to acquire and use locally measured reference values of the earth's magnetic field.

Additional objectives, features and advantages of the present invention will be apparent in the written description which follows.

SUMMARY OF THE INVENTION

The present invention provides a method for determining magnetometer errors during wellbore survey operations and referencing the corrected azimuth measurements to true north. It is capable of determining errors on up to three axes, with or without the use of an external reference measurement of the local magnetic field, and is capable of providing an accurate result using data from a minimum number of surveys. A model is used to correct the observed data and the corrected data are transformed from the tool coordinate system to a different coordinate system referenced to the earth. The difference between the corrected transformed data and reference data in the earth coordinate system is minimized to determine the model parameters. The present invention also provides a method for determining residual uncertainty in the measurements and for quality control of the measurements. By making the observations over a period of time, any deterioration of the sensors may be identified. When combined with a determination of magnetic declination using GPS data, a more accurate survey of a borehole relative to true north is obtained.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
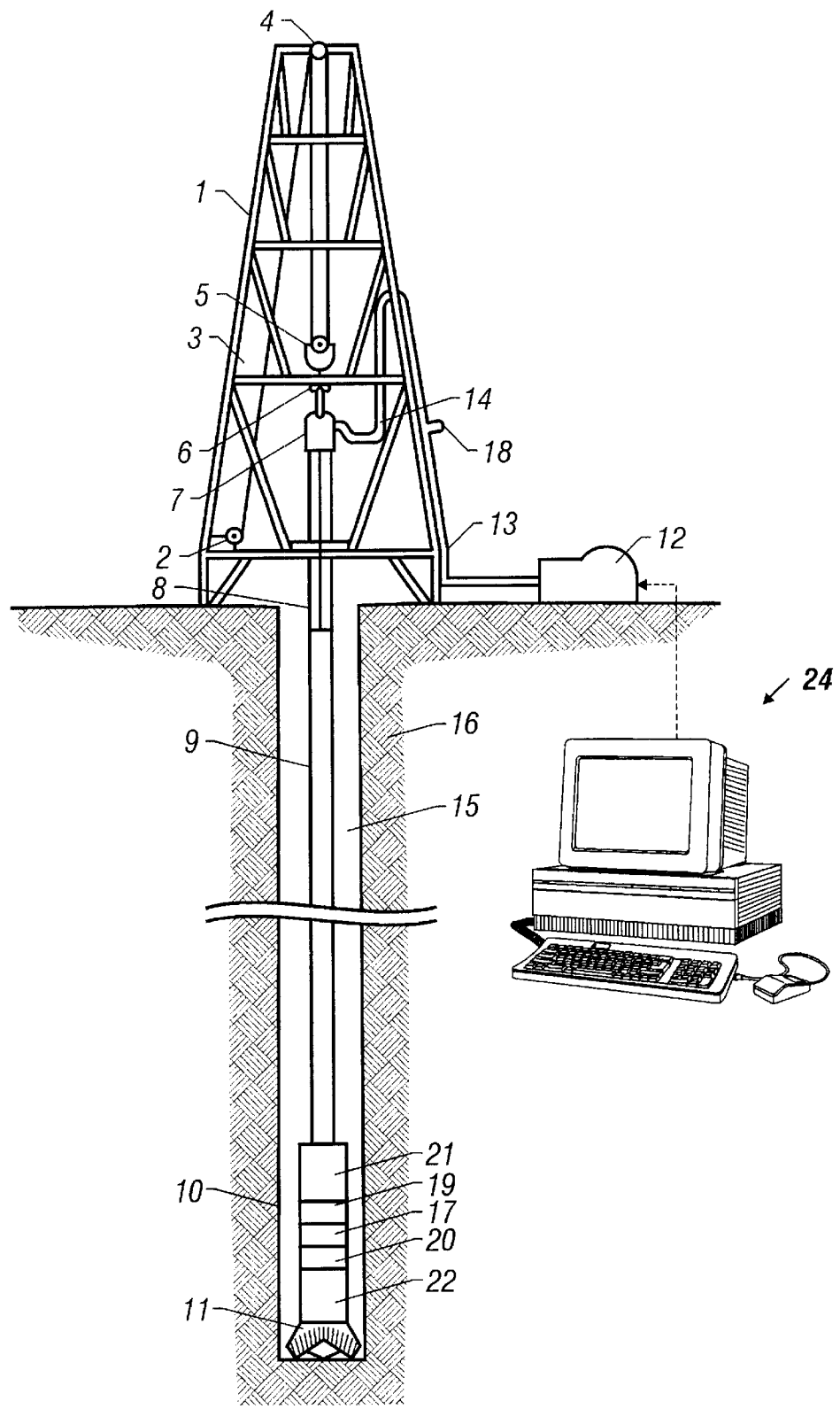
FIG. 1 shows a typical drilling operation comprising a drilling rig, a drillstring including a survey instrument, and a fluid circulating system.

FIG. 1 illustrates a rig engaged in drilling operations; the equipment includes a derrick 1, drawworks 2, cable 3, crown block 4, traveling block 5, and hook 6, supporting a drillstring which includes a swivel joint 7, kelly 8, drillpipe 9, drill collars 10, and drill bit 11. Pumps 12 circulate drilling fluid through a standpipe 13 and flexible hose 14, down through the hollow drillstring and back to the surface through the annular space 15 between the drillstring and the borehole wall 16. During the course of drilling a borehole for oil or gas exploration, it is advantageous to measure from time to time the orientation of the borehole in order to determine its trajectory. This can be accomplished by the use of a survey tool 17 located within the drill collars 10, for measuring the direction and magnitude of the local gravitational and magnetic fields with respect to a tool-fixed coordinate system. It is customary to take one survey each time the drilling operation is interrupted to add a new section to the drillstring; however, surveys can be taken at any time.

Still referring again to FIG. 1, the measured data are transmitted to the surface by modulating a valve (not shown) placed in the flow passage within or adjacent to survey tool 17, causing pressure pulses to propagate in the mud column up the drillstring, where they are detected by a pressure transducer 18 placed in the standpipe 13 and communicated to data processing system 24 which may be located on the rig floor or in a logging trailer or other work area, which is approximately programmed to (1) to interpret the pressure pulses (2) eliminate the influence of magnetic field bias error components and (3) calculate one or more conventional wellbore orientation indicators. Data processing system 24 may be programmed in accordance with the present invention. Other methods and devices for communicating data uphole, such as electromagnetic methods or acoustic signals in the drillstring, could also be used and are intended to be within the scope of the invention.

The borehole inclination can be determined by use of the gravitational measurements alone, while the borehole azimuth is determined from the gravitational and magnetic measurements; since the azimuth uses the direction of the local magnetic field as a north reference, it is necessary for the survey tool 17 to be placed in non-magnetic portions 19 and 20 of the drillstring situated between upper and lower ferromagnetic sections 21 and 22. Magnetization of the upper and lower ferromagnetic sections 21 and 22, as well as imperfections in the non-magnetic materials comprising the survey tool 17 and the non-magnetic collars 19 and 20 can produce a magnetic error field, which is fixed in the tool's frame of reference and which therefore appears as bias errors affecting the magnetic measurements. The present invention is directed to determining these errors in order to compensate for their presence and thus to provide more accurate measurements of borehole azimuth.

Figure 2:
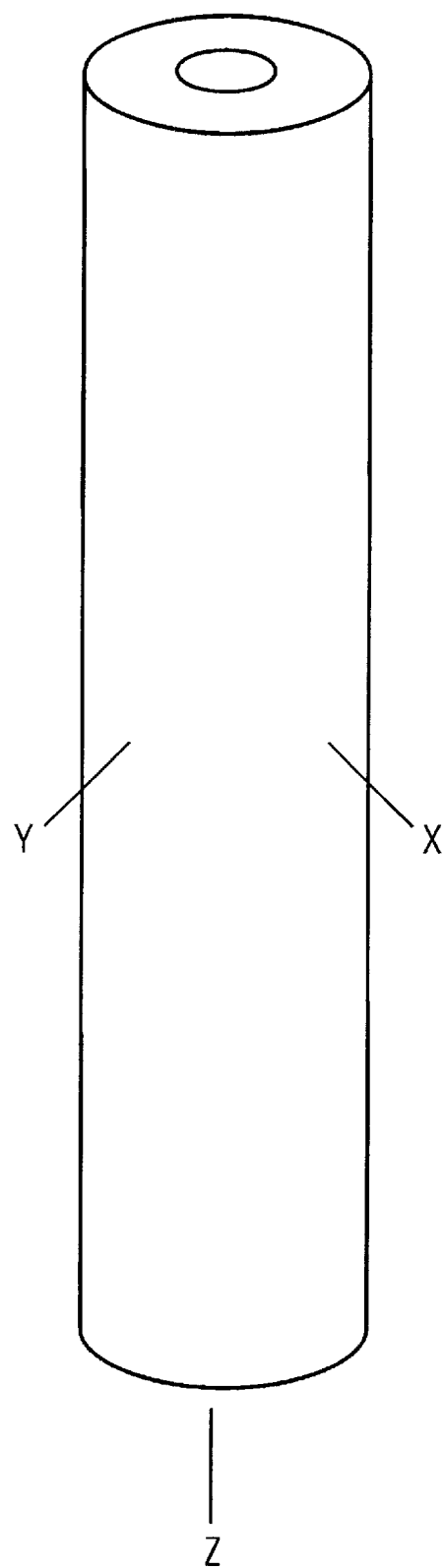
FIG. 2 shows a typical tool-fixed coordinate system used by a magnetic survey instrument located within a drillstring.

The invention will first be described as it pertains to solving for constant bias errors along each axis. It is conventional to define the tool-fixed coordinates as x, y and z, the z-coordinate being aligned with the drillstring axis as illustrated in FIG. 2. The instrument measures three components Gx, Gy and Gz of the gravitational vector G, and three components Bx, By and Bz of the magnetic flux density vector B.

The principal sources of azimuth uncertainty in magnetic surveys are sensor errors, uncertainty in the magnetic declination, instrument misalignment, and drillstring magnetization. The overall uncertainty at a bottomhole location tends to be dominated by the declination and magnetization errors, since these are systematic over a group of surveys. Arrays of accelerometers and magnetometers respectively measure the direction of the gravity and magnetic field vectors with respect to the tools x-y-z coordinate frame. The azimuth is then computed as $$A = \arctan\left[\frac{(G_x^2 + G_y^2 + G_z^2)^{0.5} \cdot (B_y G_x - B_x G_y)}{B_z \cdot (G_x^2 + G_y^2) - G_z \cdot (B_x G_x + B_y G_y)}\right] \quad (1)$$

Accelerometer and magnetometer sensor errors $\epsilon_g$ and $\epsilon_b$ cause the measurements to be imprecise, and the consequent uncertainties in azimuth may be estimated as $$\delta Ag = \epsilon_g \cdot \left[\left(\frac{\partial A}{\partial G_x}\right)^2 + \left(\frac{\partial A}{\partial G_y}\right)^2 + \left(\frac{\partial A}{\partial G_z}\right)^2\right]^{0.5} \quad (2)$$

$$= \frac{180}{\pi} \cdot \frac{\epsilon_g}{G}\left[\frac{B_v^2}{B_h^2} + \frac{1}{\tan^2 I} - 2\frac{B_v \cos A}{B_h \tan I}\right]^{0.5}$$

and $$\delta Ab = \epsilon_b \cdot \left[\left(\frac{\partial A}{\partial B_x}\right)^2 + \left(\frac{\partial A}{\partial B_y}\right)^2 + \left(\frac{\partial A}{\partial B_z}\right)^2\right]^{0.5} = \frac{180}{\pi} \cdot \frac{\epsilon_b}{B_h} \quad (3)$$

where $B_h$ and $B_v$ are the horizontal and vertical components of the local magnetic flux density, and I is the inclination.

The accelerometer and magnetometer errors are uncorrelated, thus the overall azimuth uncertainty due to sensor errors is $$\delta A = (\delta A_g^2 + \delta A_b^2)^{0.5} \quad (4)$$

The azimuth determined by such a survey is relative to magnetic north and in order to obtain a correct survey, the magnetic declination at the time of the survey must be known. Incorrect declination values are a primary source of azimuth error in magnetic surveys. One method of avoiding large declination errors is a site survey and in-field referencing to provide local magnetic field parameters in real time. In the present invention, such a site survey is obtained using the method described in U.S. patent application Ser. No. 09/303,864 field on May 11, 1999, now U.S. Pat. No. 6,212,476, the contents of which are fully incorporated herein by reference and are discussed below in reference to FIG. 5.

Another source of errors in survey tools is misalignment of the tool's axis with the borehole, however these azimuth errors are usually small in comparison with the others and their effect tends to be randomized as the toolface angle changes between surveys.

Yet another source of errors arises from the fact that as magnetic drillstring materials are rotated and stressed in the earth's magnetic field, they may develop permanent magnetization. Some components may be magnetized further during inspection and transportation. Magnetic poles are produced close to the ends of each member of the drillstring, although some components may also develop intermediate poles. Each pole produces an error field at the sensor proportional to its pole strength and inversely proportional to the square of its distance from the sensor. The error field seen by the sensor is assumed to be the sum of the contributions from all the poles.

Since magnetic drillstring components are normally spaced at least several meters axially from the sensors, the error fields due to permanent magnetization tend to be closely aligned with the z-axis. The error field therefore appears equivalent to a bias error on the z-magnetometer. A cross-axial bias effect may also be present as a result of off-axis magnetic poles, drillstring bending, or hot spots in nonmagnetic collars, but the cross-axial effect is typically an order of magnitude smaller than axial.

Magnetic drillstring components may exhibit both remanent and induced magnetization. The error field due to induced magnetization is caused by magnetic poles where the flux enters or leaves the more permeable materials; it is proportional to the magnitude of the external field and therefore it appears similar to a magnetometer scale factor error. The induced error field is not necessarily parallel to the external field, thus the apparent scale factor errors may differ among the three magnetometer axes. Experiments have shown that the induced axial magnetization associated with drillstring components is usually small in comparison with the remanent component, and its effect may sometimes be masked by downhole changes in remanent magnetization over a period of time. The error field due to induced magnetization is particularly small near the important horizontal east-west attitudes, as the axial component of the external field then approaches zero.

Conventional magnetic corrections process each survey independently, by assuming the error field to be aligned with the z-axis. The unknown z-component of the flux density leaves a single degree of freedom between the components of the local field.

Figure 3:
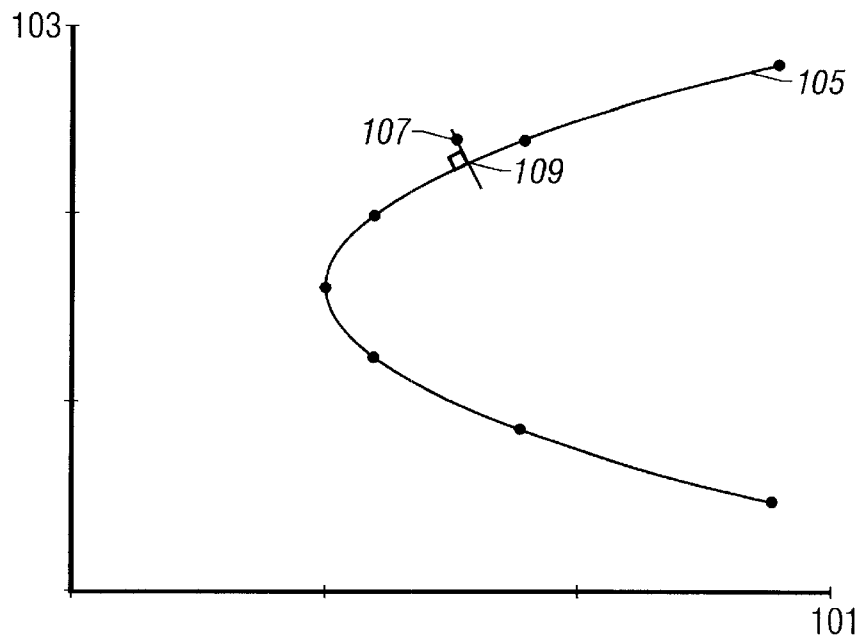
FIG. 3 (PRIOR ART) shows the application of conventional methods for the correction of bias errors based upon external field measurements.

A prior art method is illustrated schematically in FIG. 3. The abscissa 101 is the horizontal component of the magnetic field and the ordinate 103 is the vertical component of the magnetic field. Different points along the curve 105 correspond to different biases in the z-component of the magnetic field measurement and corresponding values of the apparent azimuth of the tool. The equations relating the gravity measurements to the magnetometer measurements are:

$$G_{meas} = (Gx_{meas}^2 + Gy_{meas}^2 + Gz_{meas}^2)^{0.5}$$

$$B_{meas} = (Bx_{meas}^2 + By_{meas}^2 + Bz_{meas}^2)^{0.5}$$

$$Bv_{meas} = (Bx_{meas}Gx_{meas} + By_{meas}Gy_{meas} + Bz_{meas}Gz_{meas})/G_{meas}$$

$$Bh_{meas} = (B_{meas}^2 - Bv_{meas}^2)^{0.5} \tag{5}$$

The point 107 represents an externally supplied reference field measurement. Methods for obtaining this reference measurements are discussed below. In prior art, the solution is taken as the point 109 on the curve which minimizes the vector distance to the externally-supplied reference field. This point is obtained by dropping a perpendicular from 107 to the curve.

The major problem with prior art corrections of this type is that their accuracy degrades in horizontal boreholes having an east-west orientation. These attitudes are, unfortunately, those in which the drillstring magnetization effects tend to reach a maximum.

The present invention uses data from a number of surveys and explicitly assumes that error components are common to all surveys. Based on this assumption, the variance among apparent local field values is minimized. For example, if a common axial magnetic error component is estimated as a bias $\epsilon_{bz}$, the z-magnetometer measurement of the n-th survey can be corrected by $$Bz_{corr_n} = Bz_{meas_n} - \epsilon_{b=} \tag{6}$$

The vertical and horizontal components of the local magnetic flux density can then be computed by $$Bv_n = \frac{(Bx_n \cdot Gx_n + By_n \cdot Gy_n + Bz_{corr_n} \cdot Gz_n)}{(Gx_n^2 + Gy_n^2 + Gz_n^2)^{0.5}} \tag{7}$$

and $$Bh_n = (Bx_n^2 + By_n^2 + Bz_n^2 - Bv_n^2) \tag{8}$$

$Bv_n$ and $Bh_n$ are thus measurements that have been corrected and transformed from the tool coordinate system (x,y,z) to horizontal and vertical coordinates, i.e., an earth-referenced coordinate system. The variance in the corrected transformed measurements over N surveys with respect to reference vertical and horizontal measurements $Bv_{ref}$ and $Bh_{ref}$ is thus $$V = \frac{1}{N-1} \sum_{n=1}^{N} [(Bh_n - Bh_{ref})^2 + (Bv_n - Bv_{ref})^2] \tag{9}$$

Those versed in the art would recognize that instead of horizontal and vertical reference data, the reference data could be in any other set of coordinates. Such variations are intended to be within the scope of the invention.

In one embodiment of the invention, the reference values are obtained using the method and apparatus described below with reference to FIG. 5. The advantage of such a referencing method is that local reference values may be obtained while the survey is being carried out. This avoids errors that would occur if the reference values are obtained from published tables that do not take into account temporal variations of the earth's magnetic field. With such a method, eq. (8) gives a straightforward nonlinear minimization problem that may be solved using known methods.

Figure 4:
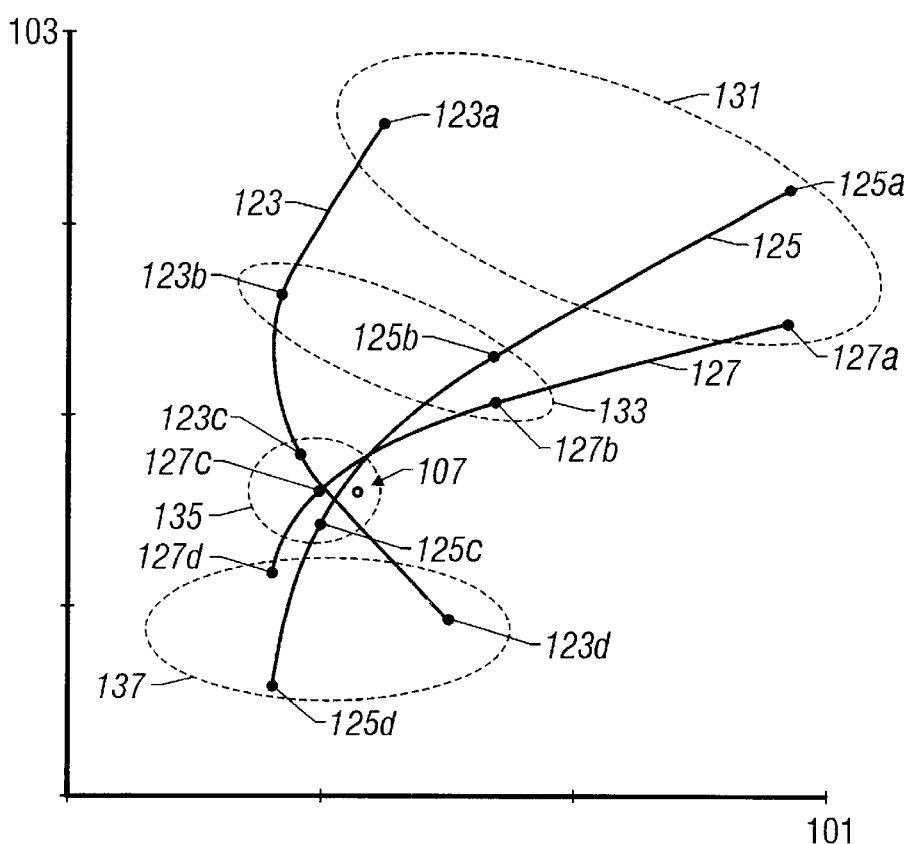
FIG. 4 shows the application of the present invention for correction of errors in multiple surveys.

Another embodiment of the present invention using multiple surveys is illustrated in FIG. 4, where three surveys are shown, depicted by 123, 125 and 127. The raw data are indicated by the points 123a, 125a and 127a. The data corresponding to one trial value of the z- magnetometer bias $\epsilon_{bz}$ are denoted by 123b, 125b and 127b, Correction with a second trial value of the z- magnetometer bias $\epsilon_{bz}$ are denoted by 123c, 125c and 127c while correction with a third trial value of the magnetometer bias gives the points 123d, 125d and 127d. In this example, the points are grouped most closely about the reference value 107 and the variance is minimized by using trial value 3 (corresponding to zone 135). A bias value close to this is selected as the optimum and the surveys are corrected accordingly.

Since the variance V is nonlinear with respect to $\epsilon_{bz}$, it is minimized by setting $(\partial V/\partial \epsilon_{bz})$ to zero, using an iterative technique such as Newton's method, in which successive approximations to $\epsilon_{bz}$ are obtained by $$\varepsilon_{bz} = \varepsilon_{bz} - \frac{\left(\frac{\partial V}{\partial e_{bz}}\right)}{\left(\frac{\partial V^2}{\partial e_{bz}^2}\right)} \quad (10)$$

After the iterative process converges to a solution, the residual value of V may be used as a quality indicator and as an input quantity for the calculation of residual uncertainty.

This invention is not limited to solving for a single unknown $\epsilon_{bz}$. It can be extended to solve for any number of unknown parameters, limited only by the number of surveys. The m unknowns are expressed as a vector U, then the solution is obtained by iteration:

$$U = U - \left(\frac{\partial^2 V}{\partial u^2}\right)^{-1} \left(\frac{\partial V}{\partial U}\right) \quad (11)$$

where $(\partial V/\partial U)$ is a vector of length m, and $(\partial^2 V/\partial U^2)$ is a m×m matrix. This is done in the preferred embodiment of the intention.

In one embodiment of the invention, the unknown vector U can contain coefficients applicable to each of the three sensor axes. The unknowns may include not only the magnetometer coefficients, but also accelerometer parameters. In this case, the expression for V is of the form $$V = \frac{1}{N-1} \sum_{n=1}^{N} [(Bh_n - Bh_{ref})^2 + (Bv_n - Bv_{ref})^2] + \quad (12)$$

$$\frac{1}{N-1} \sum_{n=1}^{N} W^2 (G_n - G_{ref})^2$$

where W is a weighting factor relating the measurement units and the residual uncertainties in the G and B fields. The same method may be used for determining biases, scale factors, and misalignments from data obtained during total field calibrations in the laboratory. Since the errors in the magnetic field have no effect on the accelerometer measurements, an alternate embodiment of the invention solves for the accelerometer term alone, i.e., minimizing eq. (12) with W having a very large value, and then repeating the minimization using values of the accelerometer parameters to find the magnetometer parameters that minimize eq. (9). Coefficients for computing reference magnetic field values for use in eqs. (9) and (12) are regularly published by agencies such as the British Geologic Survey or obtained as discussed below with reference to FIG. 5.

Another embodiment of the invention can be used where there is no independent estimate of the reference field. The reference values in eqs. (9) and (12) for variance are replaced by mean values. After making the computation, the mean field components provide an estimate of the local field without the need for any external information.

Another embodiment of the invention uses in-field referencing (IFR) or interpolation in-field referencing (IIFR); As would be known to those versed in the art, IFR provides an onsite monitoring of the local magnetic field of the earth and IIFR makes use of monitoring of the magnetic field of the earth at a location away from the wellsite in combination with a single onsite survey. This embodiment makes use of updated three-component reference field values for each survey. Substantial improvement in survey quality is obtained when the correction is combined with IFR or IIFR. By addressing both drillstring interference and declination uncertainty, the two largest contributors to azimuth uncertainty have been reduced. The present invention obtains an IFR using GPS measurements as described below with reference to FIG. 5.

For subsurface anomalies, or for IIFR applications without a site survey, the present invention can calculate two components of the local flux density, although not the declination. Offsets are added to the reference components in the variance expression, and they are solved as additional elements of the unknown vector U. Specifically, these may be a bias term in the reference field and a bias term in the dip angle. In the case where all three magnetometer scale factor errors are unknowns, a local dip offset can still be determined, although the reference total flux density must then be accepted from an external source. This mode of operation is limited by the assumption that the anomalies are the same for all surveys processed as a group.

Since the computation can identify and correct most of the systematic errors common to all surveys in the set, the residual errors are modeled as random errors or sensor noise. The magnitude of the noise can be estimated from sensor specifications, and knowledge of the local field, or it can be estimated more directly from the residual variance V observed in total flux density. The square root of V may be used to approximate the standard deviation σ of the noise on each magnetometer channel. For a three-axis correction, the effect on the solution vector of this level of noise is approximated by the covariance matrix $$C = \sum_{i=1}^{3} \sum_{j=1}^{N} (U_{ij} - U)(U_{ij} - U)^T \quad (13)$$

where $^T$ denotes the transpose of a matrix. In eq. (13), $U_{ij}$ is the solution obtained when the 1-σ noise perturbation was applied to the i-th magnetometer channel for the j-th survey, and U is the unperturbed solution. The index i in eq. (12) corresponds to the three coordinate axes of the tool while the index j corresponds to the number of surveys. Elements of the normalized covariance matrix (C/V) can be used to indicate matrix condition and stability of the solution. The effect on azimuth at each survey station can be expressed at one standard deviation by $$\delta A = \sum_{i=1}^{3} \sum_{j=1}^{N} [(A_{ij} - A)^2]^{0.5} \quad (14)$$

where $A_{ij}$ is the azimuth value at that station computed using sensor measurements adjusted by the coefficient vector $U_{ij}$, and A is the azimuth corresponding to U.

Similarly, the uncertainty in the borehole position may be estimated by $$C = \sum_{i=1}^{3} \sum_{j=1}^{N} (r_{ij} - r)(r_{ij} - r)^T$$

where $r_{ij}$ is the position vector with components (north, east, vertical) determined using perturbed measurements, and r is the unperturbed value of the position vector.

The result of using the method illustrated in FIG. 4 is an estimate of the tool azimuth referenced to magnetic north (from solution of eq. 11) and its inclination. In order to obtain a survey referenced to true north, the magnetic declination at the time of the survey must be known. The method of obtaining the magnetic declination is next discussed with reference to FIG. 5.

Figure 5:
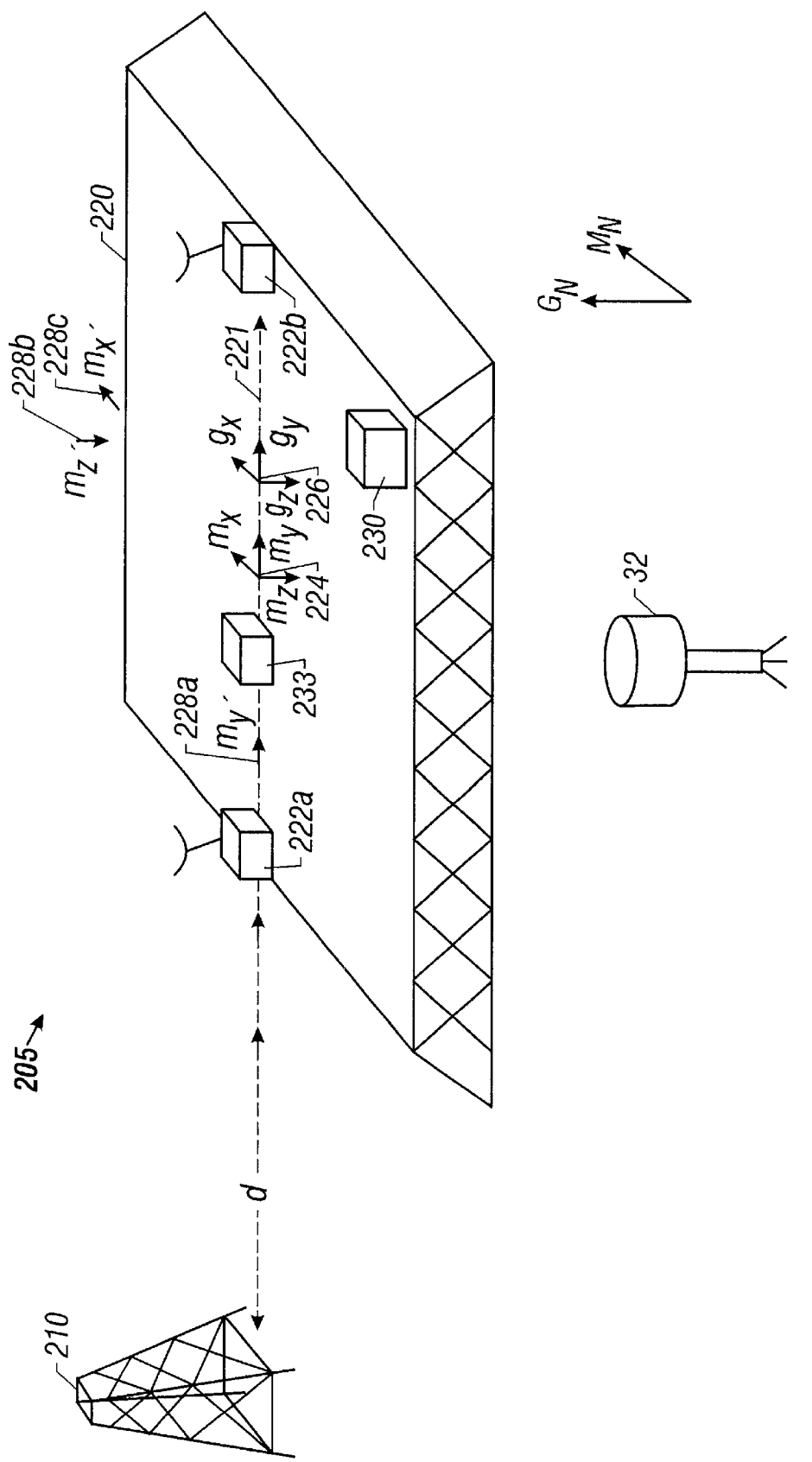
FIG. 5 shows a schematic view of an apparatus for determination of magnetic declination using GPS data.

The main component parts of the method for determination of magnetic declination are illustrated in FIG. 5. A drilling rig 210 is shown on the surface of the earth 205. At a distance d from the drilling rig, a stable platform 220 is located, the platform having a longitudinal axis generally indicated by 221. The distance d is typically between 100 and 200 feet. The platform is made of a non-magnetic material, such as fiberglass, to avoid the introduction of any local magnetic perturbations.

Also located on the platform are at least two GPS receivers, indicated here by 222a and 222b. In the illustration, without limitation, they are shown as being positioned along the longitudinal axis of the platform. Those versed in the art would recognize that as long as the two GPS receivers 222a and 222b are on a line whose orientation to the longitudinal axis of the platform is known, the invention as described below would still function.

Located on the surface of the platform is a 3-component magnetometer, indicated here by 224. For purposes of illustration, the three components ($m_r$, $m_y$ and $m_x$) of the magnetic field of the earth measured by the magnetometer 224 are indicated by arrows as being perpendicular to the surface of the platform, along the longitudinal axis of the platform and at right angles to the longitudinal axis of the platform. These three components are orthogonal to each other. Also located on the surface of the platform is a 3-component accelerometer 226 that measures the components of gravity $g_x$, $g_y$ and $g_z$ in the x, y, and z directions.

A processor 230 that may be located on or in the vicinity of the platform, receives signals from the GPS receivers 222a and 222b, the magnetometer 224 and the accelerometer 226. The signals may be transmitted by any suitable telemetry means, including wires, fiber optics or by radio transmission. The method of determining the attitude of the GPS receivers with respect to each other is based upon the NAVSTAR GPS based Attitude Determination System incorporated in a product sold under the mark STINGRAY® by Collins Avionics and Communications Division of Rockwell. A summary of the technique used to determine the attitude of the two GPS receivers is given here.

The present invention also includes three single component magnetometers labeled 228a, 228b and 228c that are at locations displaced in the y, z and x directions from the magnetometer 226. Differences between values measured by these three single component magnetometers and the corresponding components measured by magnetometer 226 gives a measurement of the local magnetic field gradient. This serves as a quality control measurement. For example, a bucket of nails placed near the platform inadvertently will provide a large change in the magnetic gradient that is easily detectable and appropriate remedial steps can be taken.

As described in the '864 application (now U.S. Pat. No. 6,212,476), the use of the GPS sensors in conjunction with the accelerometers makes it possible to determine the azimuth (yaw) as well as the roll and tilt angle of the platform. When combined with the magnetometer measurements, the magnetic declination may be determined. Thus, using the determined magnetic declination (something that is done in real time in conjunction with the downhole survey) makes it possible to reference the survey data obtained from the method described in FIG. 4 to true north.

Additionally, the magnetometer data from the surface equipment also provides reference measurements (such as total field and dip angle) that may be used in the minimization of eq. 9 as discussed above, to give downhole magnetometer measurements corrected for magnetometer bias.

As in prior art, the present invention includes the capability for transmitting measurements to the earth's surface utilizing measurement-while-drilling (MWD) transmission techniques. These data may be used by a processor 24 that is preprogrammed in accordance with the methods discussed above. The program includes as inputs the x-, y- and z-components of the local magnetic and gravitational fields at each survey station. The calculations are performed in accordance with the description above, and the processor provides as an output for each survey station the wellbore azimuth and inclination. In an alternate embodiment of the invention, the processor may be downhole, and reference field measurements may be transmitted downhole to the processor.

The present intention is illustrated by way of the foregoing description, and various modifications will be apparent to those skilled in the art. It is intended that all such variations be within the scope and spirit of the appended claims.

What is claimed is:

1. A method of obtaining a survey of a wellbore during drilling of a wellbore, comprising:
    (a) obtaining a plurality of magnetic and gravitational measurements at selected locations in said wellbore;
    (b) using a model comprising a set of model parameters for correcting values of said plurality of magnetic and gravitational measurements for producing a plurality of corrected magnetic and gravitational measurements;
    (c) performing a coordinate transformation of the plurality of corrected magnetic and gravitational measurements to give a plurality of transformed corrected magnetic and gravitational measurements;
    (d) defining a measure of a difference between the plurality of transformed corrected measurements and reference values of magnetic and gravitational measurements;
    (e) determining values for the set of model parameters that minimize the measure of difference, giving a survey of the wellbore referenced to magnetic north;
    (f) obtaining estimates of magnetic declination corresponding to said plurality of magnetic and gravitational measurements in said wellbore; and
    (g) correcting said survey to true north using said estimates of magnetic declination.

2. The method of claim 1 further comprising determining the accuracy of one or more of the plurality of magnetic and gravitational measurements using the model.

3. The method of claim 2 wherein determining the accuracy of one or more of the plurality of magnetic or gravitational measurements further comprises determining the minimum value of said measure of difference.

4. The method of claim 1 wherein the model includes one or more parameters selected from (i) a bias in at least one component of the gravity measurements, (ii) a bias in at least one component of the magnetic measurements, (iii) a scale factor for at least one component of the gravity measurements, (iv) a scale factor for at least one component of the magnetic measurement, (v) a misalignment of at least one sensor making the gravity measurements, and (vi) a misalignment of at least one sensor making the magnetic measurements.

5. The method of claim 1 wherein determining the model parameter includes one or more parameters selected from (i) a bias in at least one component of the gravity measurements, (ii) a scale factor for at least one component of the gravity measurements, and, (iii) a misalignment of a sensor used to make the gravity measurements, to give a subset of determined model parameters, the method further comprising using the subset of determined model parameters to obtain additional model parameters selected from (A) a bias for at least one component of the magnetic measurements (B) a scale factor for at least one of the magnetic measurements, and (C) a misalignment of at least one sensor used for making the magnetic measurements.

6. The method of claim 1 further comprising providing an onsite monitoring of the local magnetic field of the earth to give said reference values.

7. The method of claim 1 further comprising monitoring the magnetic field of the earth at a location away from the wellsite to give said reference values.

8. The method of claim 1 wherein said reference values further comprise at least one independent measurement selected from (i) a component of the gravitational field, and (ii) a component of the magnetic field.

9. The method of claim 1 wherein said reference values are averages of said plurality of said transformed corrected measurements.

10. The method of claim 1 further comprising determining a variation in the values for the set of model parameters over a period of time to determine any deterioration in sensors making the plurality of measurements.

11. The method of claim 1 wherein the plurality of magnetic and gravitational measurements are sent by telemetry to a surface processor and the surface processor is adapted to perform steps (b), (c), (d) and (e).

12. The method of claim 1 wherein obtaining estimates of the magnetic declination further comprises:
(i) placing at least two Global Positioning Sensor (GPS) receivers, an accelerometer and a 3-component magnetometer on a non-magnetic platform near said wellbore, said at least two GPS receivers spaced apart from each other;
(ii) receiving electromagnetic signals from a plurality of satellites at the at least two GPS receivers;
(iii) providing signals indicative of the position of the at least two GPS receivers to a processor;
(iv) measuring three independent components of the earth's magnetic field with the 3-component magnetometer and providing signals indicative thereof to the processor;
(v) measuring three independent components of acceleration using the accelerometer and providing signals indicative thereof to the processor; and
(vi) using the processor to process the signals from the at least two GPS receivers, the accelerometer and the 3-component magnetometer to determine the magnetic declination.

13. The method of claim 12 wherein said platform is a fixed platform and said accelerometer comprises a two component accelerometer.

14. The method of claim 12 wherein said accelerometer comprises a three component accelerometer.

15. The method of claim 12 further comprising:
A. using a proton magnetometer for measurement of the total magnetic intensity of the earth's magnetic field and providing a signal indicative thereof to said processor; and
B. including the signal from the proton magnetometer in the processing of signals by the processor to determine the magnetic declination.

16. The method of claim 12 wherein using the processor further comprises:
A. determining a yaw angle from the signals from the at least two GPS receivers and the accelerometer;
B. determining a magnetic north direction from the signals from the 3-component magnetometer and the 3-component accelerometer; and
C. determining the magnetic declination from the results of (i) and (ii).

17. The method of claim 1 wherein obtaining estimates of the magnetic declination further comprises:
(i) placing on a non-magnetic platform near said wellbore at least two spaced apart Global Positioning Sensor (GPS) receivers, a 3-component magnetometer, and at least one additional sensor for providing a signal indicative of a roll angle of said platform, said at least one additional sensor selected from (A) an accelerometer, and, (B) an additional GPS receiver spaced apart from and non-collinear with said at least two GPS receivers, and
(ii) using a processor to process signals from the at least two GPS receivers, the 3-component magnetometer and the at least one additional sensor.

18. The method of claim 17 wherein said platform is a fixed platform and said accelerometer comprises a two component accelerometer.

19. The method of claim 17 wherein said accelerometer comprises a three component accelerometer.

20. The method of claim 17 further comprising:
I. using a proton magnetometer for measurement of the total magnetic intensity of the earth's magnetic field and providing a signal indicative thereof to said processor; and
II. including the signal from the proton magnetometer in the processing of signals by the processor to determine the magnetic declination.

21. The method of claim 17 wherein using the processor further comprises:
A. determining a yaw angle from the signals from the at least tow GPS receivers and the accelerometer,
B. determining a magnetic north direction from the signals from the 3-component magnetometer and the 3-component accelerometer; and
C. determining the magnetic declination from the results of (i) and (ii).

* * * * *

UNITED STATES PATENT AND TRADEMARK OFFICE
CERTIFICATE OF CORRECTION

PATENT NO. : 6,508,316 B2  
DATED : January 21, 2003  
INVENTOR(S) : Robert Alan Estes, Hatem Salem Morsy and Andrew G. Brooks It is certified that error appears in the above-identified patent and that said Letters Patent is hereby corrected as shown below:

Column 3,  
Line 26, replace "to the tools x-y-z" with -- to the tool's x-y-z --.

Column 4,  
Line 64, replace "09/303,864 field on" with -- 09/303,864 filed on --.

Column 5,  
Line 67, replace "Methods for obtaining this reference measurements" with -- Methods for obtaining this reference measurement --.

Column 10,  
Line 20, replace "The present intention" with -- The present invention --.

Signed and Sealed this

Twenty-ninth Day of April, 2003

JAMES E. ROGAN  
*Director of the United States Patent and Trademark Office*